United States Patent [19]

Ogawa

[11] Patent Number: 5,321,722

[45] Date of Patent: Jun. 14, 1994

[54] MULTIPOINT CONNECTED COMMUNICATION SYSTEM HAVING FUNCTION OF RETRAINING MODEMS PROVIDED THEREIN AND METHOD OF RETRAINING THE MODEMS

[75] Inventor: Tohru Ogawa, Fuchu, Japan

[73] Assignee: Fujitsu Limited, Kawasaki, Japan

[21] Appl. No.: 48,950

[22] Filed: Apr. 19, 1993

Related U.S. Application Data

[63] Continuation of Ser. No. 555,624, Jul. 23, 1990, abandoned.

[30] Foreign Application Priority Data

Jul. 21, 1989 [JP] Japan .................................. 1-189592

[51] Int. Cl.⁵ .......................... H04B 1/38; H04L 27/28
[52] U.S. Cl. ........................................... 375/8; 375/37; 375/10; 455/88
[58] Field of Search ...................... 375/7, 8, 10, 37-38, 375/107, 109, 121; 370/32-33, 85.7-85.8, 95.1-95.3; 341/174, 180; 178/4.1 C, 69 L, 69 H; 455/24, 49.1, 51.2, 69, 78, 88; 379/49

[56] References Cited

U.S. PATENT DOCUMENTS

| | | | |
|---|---|---|---|
| 4,672,630 | 6/1987 | Kaku ..................................... | 375/13 |
| 4,674,103 | 6/1987 | Chevillat et al. ..................... | 375/13 |
| 4,736,388 | 4/1988 | Eguchi .................................. | 375/8 |
| 4,792,940 | 12/1988 | Hiraguchi ............................. | 375/8 |
| 4,815,105 | 3/1989 | Bottoms et al. ...................... | 375/7 |
| 4,847,880 | 7/1989 | Kamerman et al. ................... | 375/8 |
| 4,910,754 | 3/1990 | Allen et al. .......................... | 375/121 |
| 4,956,852 | 9/1990 | Hodge .................................. | 375/8 |

*Primary Examiner*—Stephen Chin
*Assistant Examiner*—Young Tse
*Attorney, Agent, or Firm*—Staas & Halsey

[57] ABSTRACT

A communication system in which a plurality of multipoint connected satellite stations are connected via down line and an up line to a master station. Each of the satellite stations monitors presence or absence of occurrence of an abnormality in the down line, judges whether the abnormality is present or not and, where the abnormality is present, informs the master station of the nature of the abnormality via the up line. In turn, the master station monitors presence or absence of an alarm indicating abnormality from each of the satellite stations, judges whether the alarm is detected or not and, where the alarm is detected, reads past record information concerning abnormality detection in the satellite station concerned and information on retraining execution time, then judges whether the down line is normal or not and, where the down line is normal, sends a training signal again to the down line to retrain a MODEM corresponding to the satellite station concerned. Accordingly, it is possible to quickly restore demodulation processing by each of the satellite stations to a respective normal status after a recovery of trouble in a down line.

16 Claims, 8 Drawing Sheets

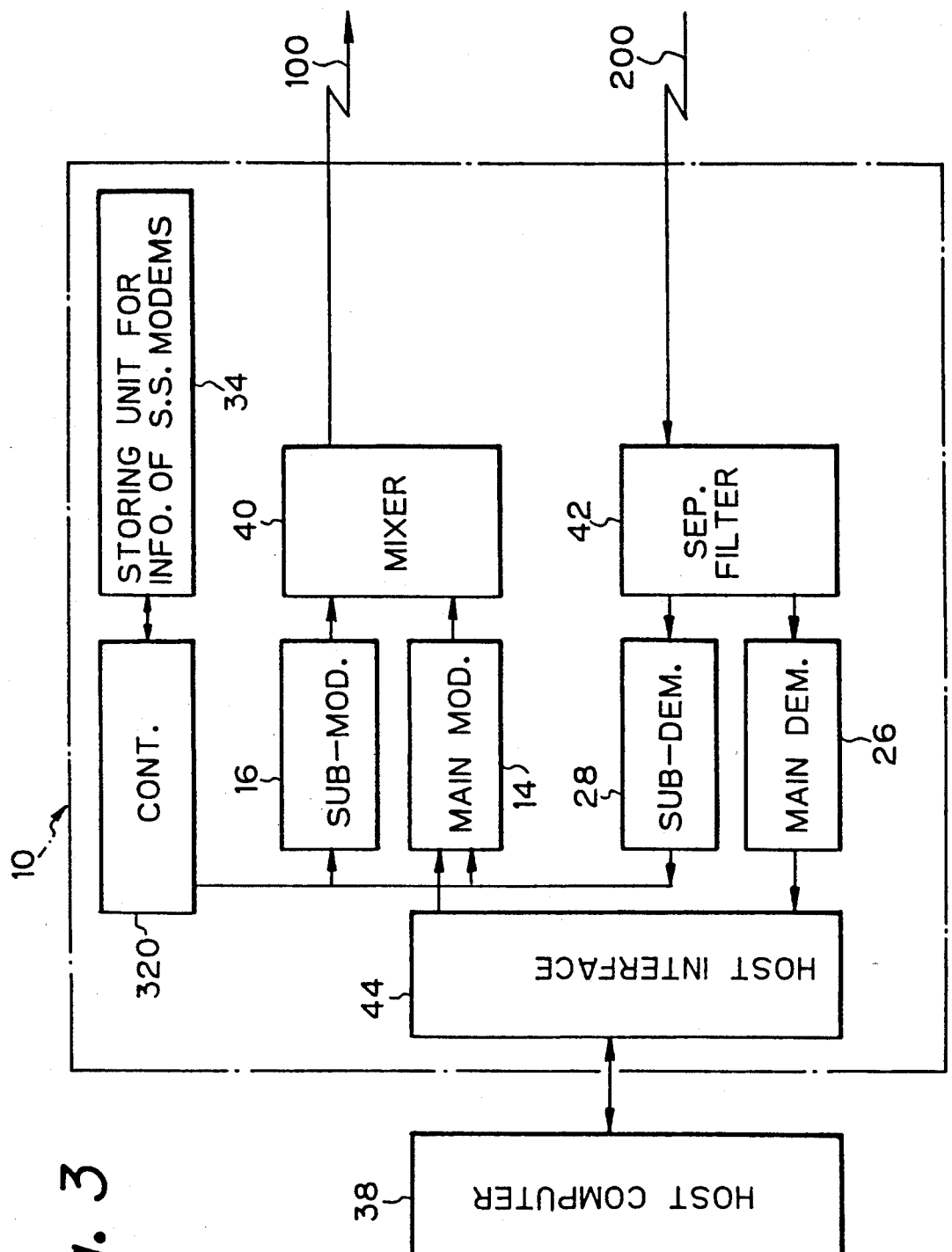

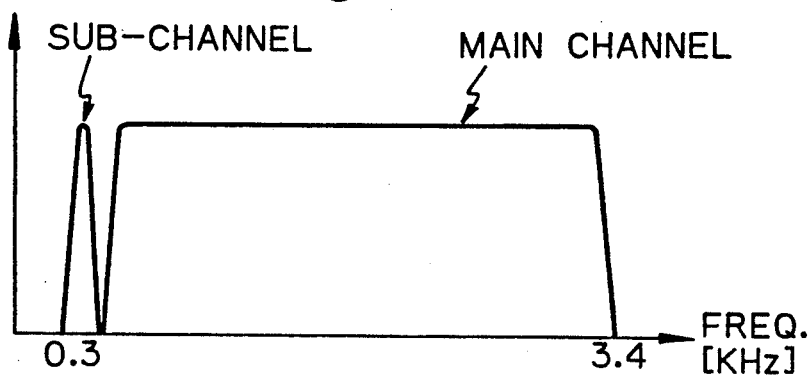
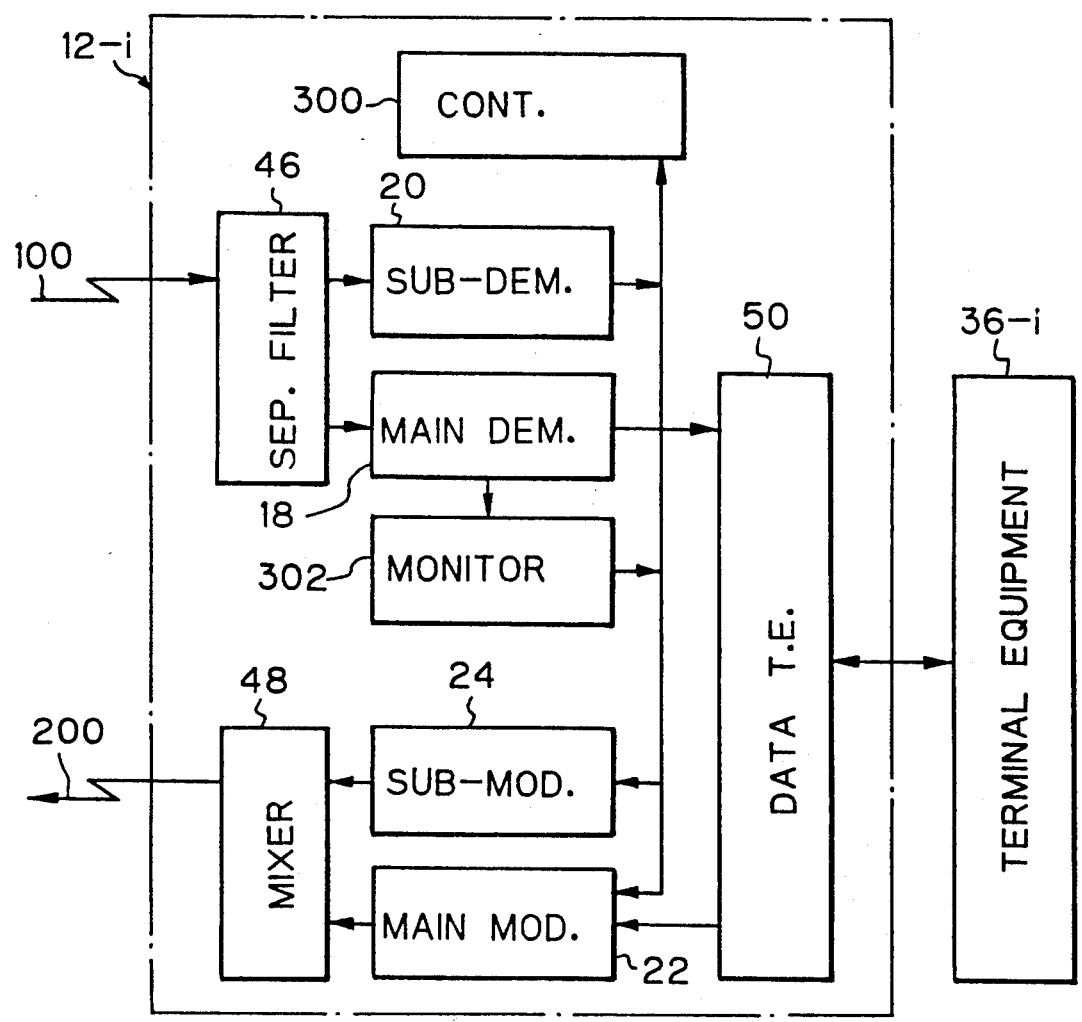

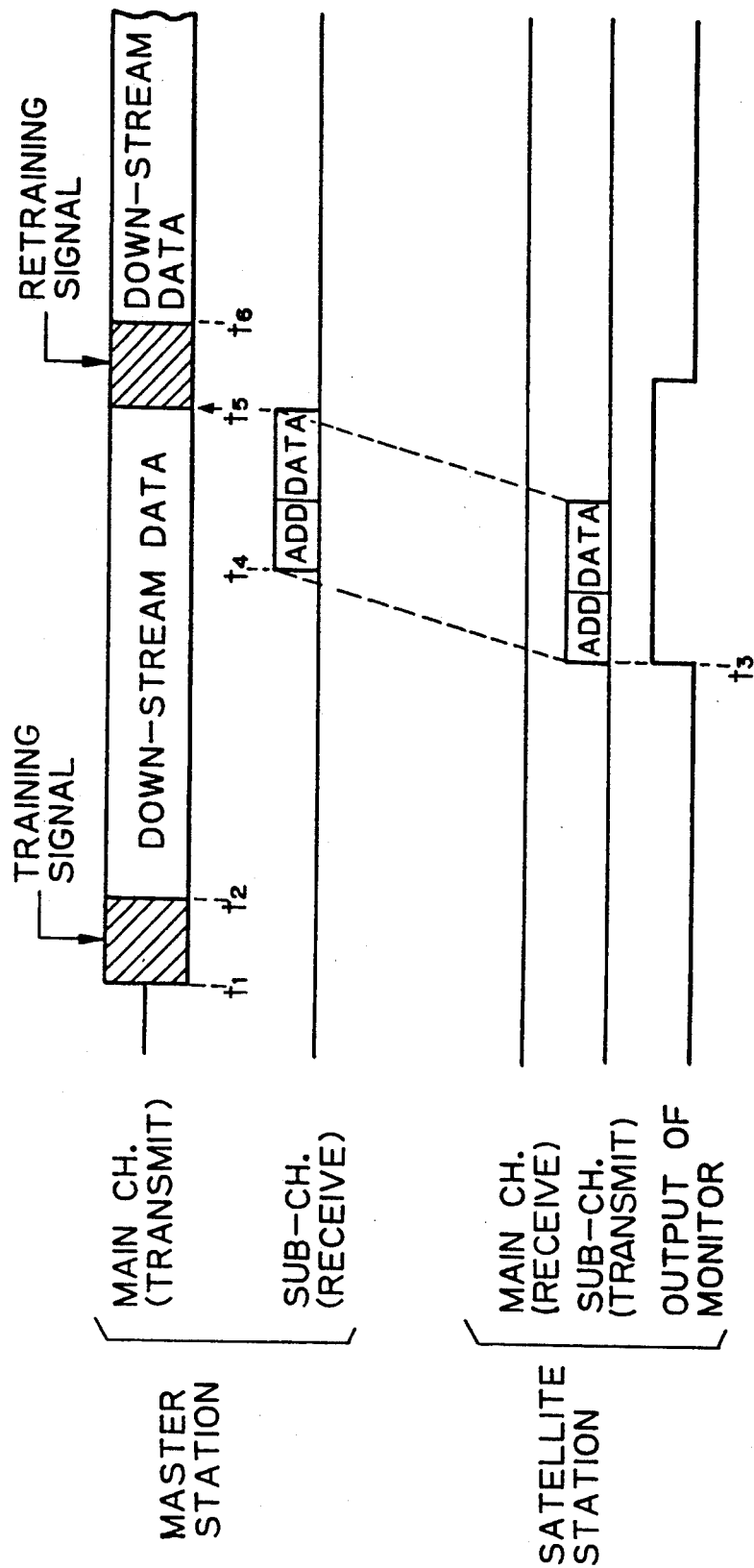

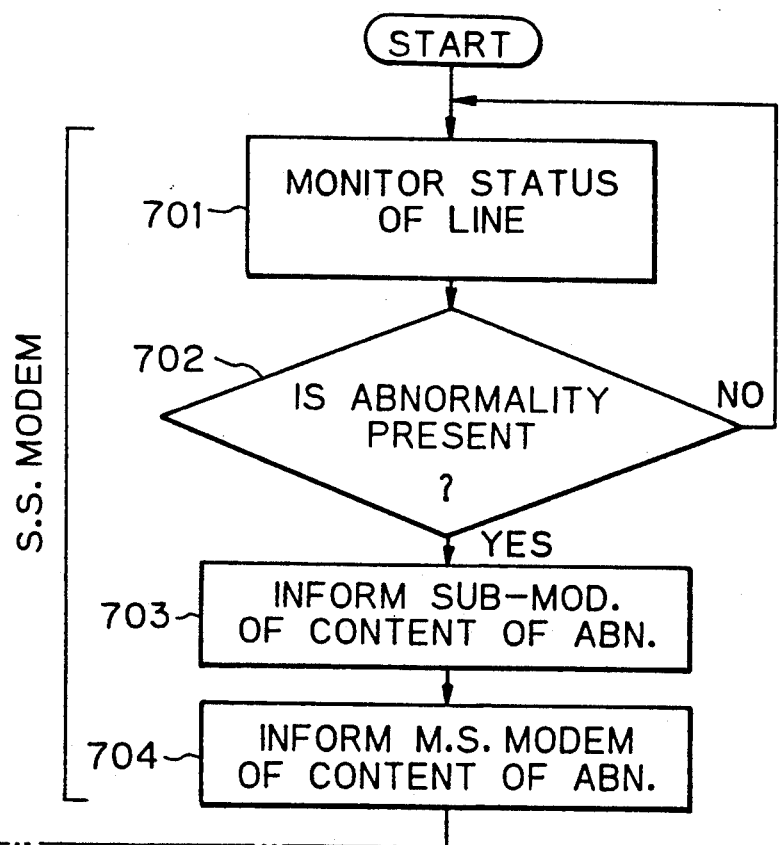

MULTIPOINT CONNECTED COMMUNICATION SYSTEM HAVING FUNCTION OF RETRAINING MODEMS PROVIDED THEREIN AND METHOD OF RETRAINING THE MODEMS

This application is a continuation of application Ser. No. 07/555,624, filed Jul. 23, 1990, now abandoned.

BACKGROUND OF THE INVENTION

1. Field of the Invention

The present invention relates to a system in which a plurality of multipoint connected satellite stations are connected via a down line and an up line to a master station. More particularly, it relates to a technique of retraining a modulator and demodulator (MODEM) provided in each of the satellite stations.

2. Description of the Related Art

In a multipoint connected communication system, plurality of MODEMs provided in satellite stations (hereinafter referred to as a satellite station MODEM) are multipoint connected via a down line and an up line to a MODEM provided in a master station (hereinafter referred to as a master station MODEM). Access to terminal equipment provided at each satellite station is carried out according to a polling procedure from a host computer provided in the master station and, in turn, data from the terminal equipment to which access is carried out is modulated in the corresponding satellite station and sent to the master station.

In this communication operation, once the master station starts sending the polling data, a demodulation unit in the satellite station MODEM, which receives the polling data via the down line, is brought to a status of normally receiving data (data normally-receiving status). This is because the satellite station MODEM per se is not conscious of the kind of data being received, i.e., it cannot discriminate user data such as the polling data. In this regard, the master station sends a training signal to each of the satellite station MODEMs prior to the sending of the polling data. Upon receipt of the training signal, each satellite station MODEM initializes an automatic gain controller (AGC), an automatic equalizer (AEQ), an automatic carrier phase controller (CAPC), and the like, provided in the corresponding demodulation unit. After the initialization, the satellite station MODEM receives and demodulates user data such as the polling data.

However, where a line trouble or abnormality due to instantaneous breaking or the like occurs in the down line, seen from the demodulation unit in the satellite station MODEM, through which data communication is normally carried out, a disadvantage arises in that operation parameters of the AGC, AEQ, CAPC, and the like, in the satellite station MODEM are changed to abnormal values. As a result of the disadvantage, it takes long time to restore demodulation processing or operation by the satellite station MODEM to its normal status after the trouble concerned is recovered.

In this regard, a technique is strongly demanded in which, even if a trouble occurs in the down line, the demodulation processing by the satellite station MODEM can be quickly restored to its normal status after recovery of the trouble.

SUMMARY OF THE INVENTION

An object of the present invention is to provide a multipoint connected communication system which can quickly restore demodulation processing by each of satellite station MODEMs to a respective normal status after a recovery of trouble in a down line.

According to one aspect of the present invention, there is provided a communication system in which a plurality of multipoint connected satellite stations are connected via a down line and an up line to a master station, the master station including a first MODEM unit for modulating user data and various control information to transmit the modulated data by means of different channels of the down line and demodulating user data and various control information from modulation signals received in different channels of the up line, and each of the satellite stations including a second MODEM unit for demodulating user data and various control information from modulation signals received in the different channels of the down line, and modulating user data and various control information to transmit the modulated data by means of the different channels of the up line, wherein each satellite station comprises an abnormality detecting unit, operatively connected to the second MODEM unit, for controlling the second MODEM unit to request the master station to re-send a training signal when the abnormality detecting unit detects an abnormality from the quality of a signal received at the second MODEM unit, and the master station comprises a retraining command unit, operatively connected to the first MODEM unit, for commanding the first MODEM unit to send the training signal when the first MODEM unit receives a signal indicating the request for re-sending of the training signal from any one of the satellite stations.

The master station system may further comprise a storing unit for storing past record information concerning abnormality detection in the satellite stations and information on execution time of the retraining, obtained through the first MODEM unit, whereby the retraining command unit refers to the storing unit upon receipt of a new request for retraining and, based on the past record information on retraining, determines whether it should command the new retraining or not.

Also, the retraining command unit may comprise a unit for disregarding the request for retraining where another retraining is requested before the time required for a previous retraining elapses, or where the master station receives a plurality of requests for the retraining from identical satellite station.

Also, according to another aspect of the present invention, there is provided a method of retraining a MODEM provided in each of a plurality of multipoint connected satellite stations which are connected via a down line and an up line to a master station including a storing unit, the method comprising the steps of: in each of the satellite stations, monitoring presence or absence of occurrence of abnormality in the down line; judging whether the abnormality is present or not; and, where the abnormality is present, informing the master station of a content of the abnormality via the up line; and, in the master station monitoring presence or absence of an alarm indicating abnormality from each of the satellite stations; judging whether the alarm is detected or not; where the alarm is detected, reading past record information concerning abnormality detection in the satellite station concerned and information on retraining execution time from the storing unit; judging whether the down line is normal or not; and where the down line is normal, sending a training signal again to the down line to retrain a MODEM corresponding to the satellite station concerned.

BRIEF DESCRIPTION OF THE DRAWINGS

Other objects and features of the present invention will be described hereinafter in detail by way of preferred embodiments with reference to the accompanying drawings, which:

FIG. 3 is a block diagram illustrating a constitution of the master station MODEM according to an embodiment of the present invention;

FIG. 4 is an explanatory diagram of the allocation of frequencies to the main channel and sub-channel;

FIG. 5 is a block diagram illustrating a constitution of the satellite station MODEM according to an embodiment of the present invention;

FIG. 7 is a timing chart for explaining the retraining operation in the system of the present invention and FIGS. 8A and 8B are flow charts representing the operations of the MODEMs shown in FIGS. 3 and 5.

DESCRIPTION OF THE PREFERRED EMBODIMENTS

For a better understanding of the preferred embodiment according to the present invention, the problems in the prior art will be explained with reference to FIG. 1.

Figure 1:
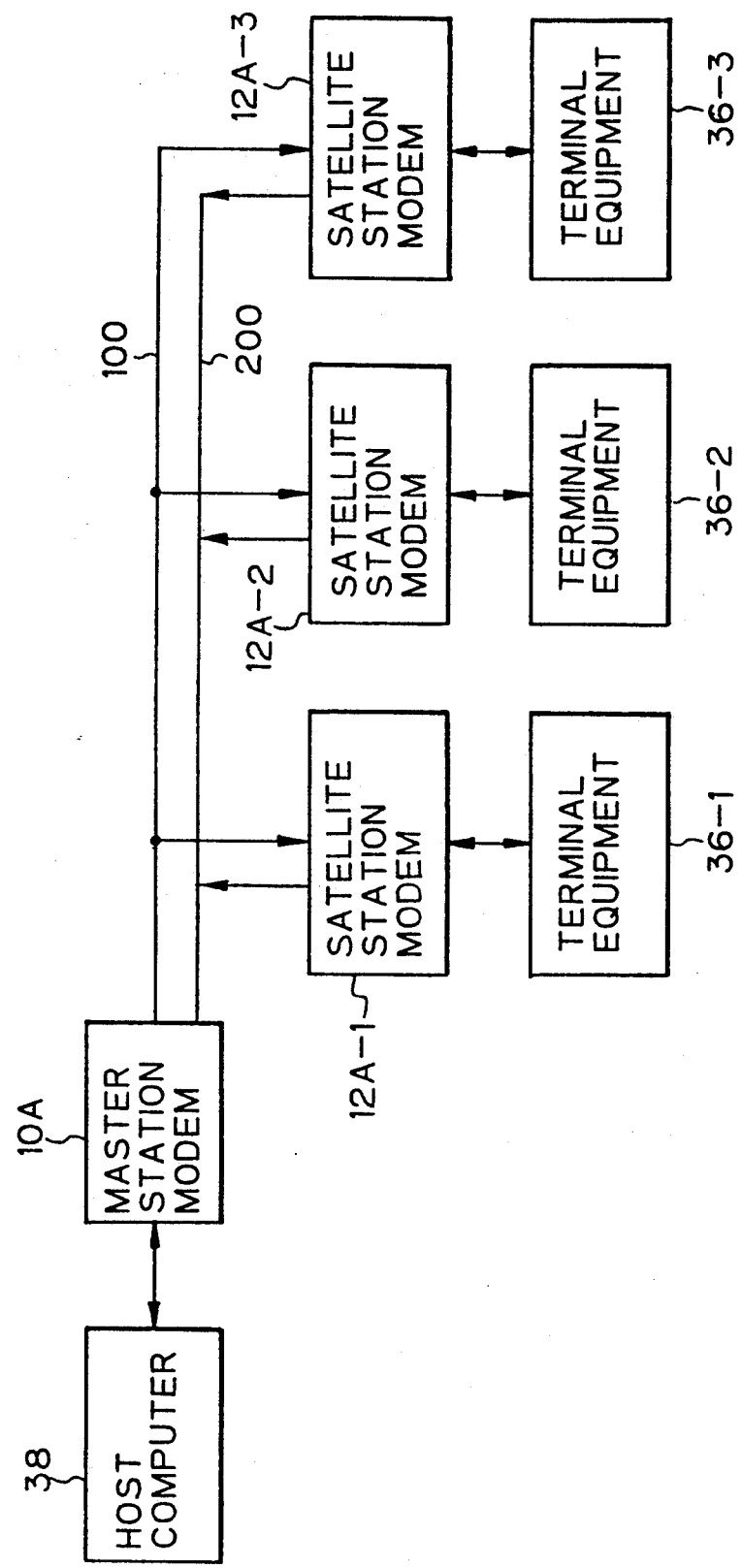
FIG. 1 is a block diagram illustrating a constitution of a typical multipoint connected communication system.

FIG. 1 illustrates a constitution of a typical multipoint connected communication system.

In the illustration, reference 10A denotes a master station MODEM and references 12A-1 to 12A-3 denote satellite station MODEMs connected in multipoint connection and connected via a down line 100 and an up line 200. The master station MODEM 10A transmits a polling modulation signal via the down line 100 to the satellite station MODEMs 12A-1 to 12A-3 in accordance with a predetermined polling procedure from a host computer 38.

The polling modulation signal transmitted from the master station MODEM 10A is demodulated by the satellite station MODEMs 12A-1 to 12A-3 and then sent to the corresponding terminal equipments 36-1 to 36-3, and any of the terminal equipments which has identified access to itself outputs a response data. For example, assume that the terminal equipment 36-1 outputs the response data. In this case, the corresponding satellite station MODEM 12A-1 modulates the response data to transmit the modulated data via the up line 200 to the master station MODEM 10A and, turn, the master station MODEM 10A demodulates the modulated data and outputs the demodulated data to the host computer 38.

In the above operation, when the master station MODEM 10A starts the polling operation for the satellite station MODEMs 12A-1 to 12A-3, the former first transmits a training signal to the latter. Upon receipt of the training signal, each of the satellite station MODEMs 12A-1 to 12A-3 initializes circuits such as AGC, AEQ, CAPC, and the like, which are provided in the corresponding demodulation unit (not shown) and, in combination, have a function of correcting deterioration of the lines. By this initialization, the circuits set their operation (or demodulation) parameters to values which are adapted to factors of the line deterioration and set differently in different satellite stations. After the setting of the operation parameters, the master station MODEM 10A sends polling data to the satellite station MODEMs 12A-1 to 12A-3.

On the other hand, when each of the satellite station MODEMs 12A-1 to 12A-3 sends data in response to the polling data to the master station MODEM 10A, each satellite station MODEM first sends a training signal to initialize demodulation unit in the master station MODEM and then modulates the response data to send the modulated data to the master station MODEM.

In the above multipoint connected communication system; where a line trouble due to instantaneous breaking or the like occurs in the down line 100 through which the modulated signal such as the polling data from the master station MODEM 10A is normally transmitted, each demodulation unit in the satellite station MODEMs 12A-1 to 12-3 controls the respective operation parameters to correct factors of the deterioration caused by the line trouble.

However, the ability of each MODEM to correct the factors of the line deterioration is limited and thus it very difficult to completely remove the line trouble even if the operation parameters are controlled. As a result, each of the operation parameters in the demodulation units is changed to an abnormal value which is out of the range of acceptability.

Accordingly, when the line trouble concerned is recovered, the demodulation unit in the respective satellite station MODEM is in an abnormal operation status, and employs data received after the recovery and carries out the initializing operation to gradually restore its normal status. As for the initializing operation by means of the ordinary data, however, it takes longer time to restore the demodulation processing to its normal status after the recovery of trouble, compared with that by means of the training signal. In particular, the higher the operation speed of the MODEM becomes, the longer the time required for recovery by means of the ordinary data becomes.

Therefore, the prior art multipoint connected communication system has a drawback in that, after the trouble in the down line is recovered, it is impossible to re-start data communication quickly.

Figure 2:
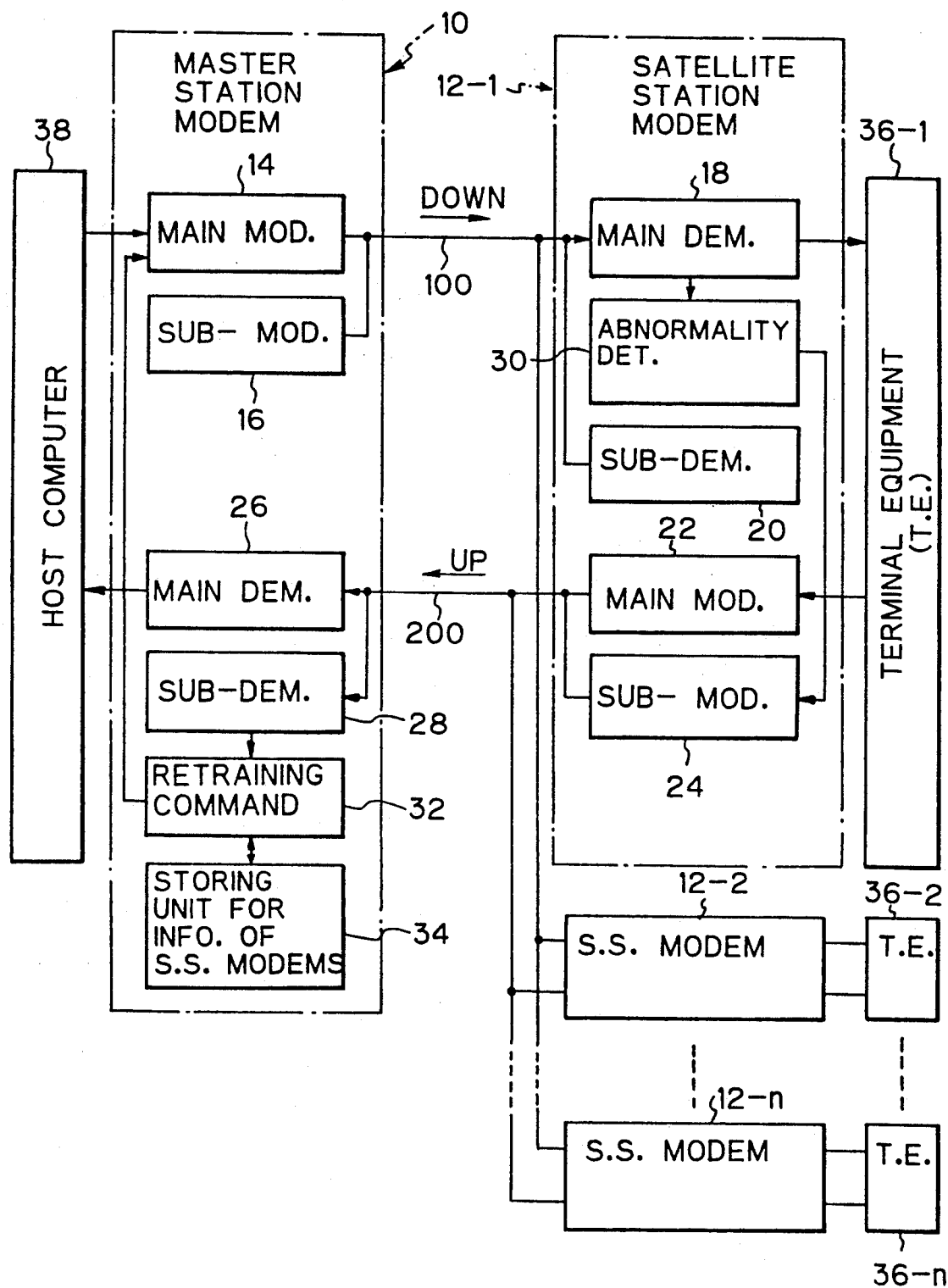
FIG. 2 is a block diagram illustrating the fundamental constitution of the multipoint connected communication system according to the present invention.

FIG. 2 illustrates the fundamental constitution of the multipoint connected communication system according to the present invention.

In the illustrated system, a plurality of multipoint connected satellite station MODEMs 12-1 to 12-$n$ are connected via a down line 100 and an up line 200 to a master station MODEM 10. The master station MODEM 10 includes a main modulation unit 14 for modulating user data to transmit the modulated data at a relatively high speed by means of main channel of the down line 100, a sub-modulation unit for modulating various control information to transmit the modulated data at a relatively low speed by means of a sub-channel of the down line 100, a main demodulation unit 26 for demodulating user data from a modulation signal received in a main channel of the up line 200, and a sub-demodulation unit 28 for demodulating various control information from a modulation signal received in a sub-channel of the up line 200. On the other hand, each of the satellite station MODEMs 12-1 to 12-$n$ includes a main demodulation unit 18 for demodulating user data from a modulation signal received in the main channel of the down line 100, a sub-demodulation unit 20 for demodulating various control information from a modulation signal received in the sub-channel of the down line 100, a main modulation unit 22 for modulating user data to transmit the modulated data at a relatively high speed by means of the main channel of the up line 200, and a sub-modulation unit 24 for modulating various control information to transmit the modulated data at a relatively low speed by means of the sub-channel of the up line 200

Furthermore, each of the satellite station MODEMs 12-1 to 12-n includes an abnormality detecting unit 30, operatively connected to the main demodulation unit 18, controlling the sub-modulation unit 24 to request the master station MODEM 10 to re-send a training signal when the abnormality detecting unit 30 detects an abnormality from the quality of a signal received at the main demodulation unit 18. On the other hand, the master station MODEM 10 includes a storing unit 34 for storing past record information concerning abnormality detection in the satellite stations and information on execution time of the retraining, obtained through the sub-demodulation unit 28, and a retraining command unit 32, operatively connected to the sub-demodulation unit 28, for referring to the storing unit 34 and commanding the main modulation unit 14 to send the training signal when the sub-demodulation unit 28 receives a signal indicating the request for re-sending of the training signal from any one of the satellite station MODEMs 12-1 to 12-n.

Furthermore, a host computer 38 is connected to the main modulation unit 14 and main demodulation unit 26, and each of a plurality of terminal equipments 36-1 to 36-n is connected to the main demodulation unit 18 and main modulation unit 22 in the corresponding satellite station MODEM 12-1 to 12-n, respectively.

FIG. 3 illustrates a constitution of the master station MODEM 10 as an embodiment of the present invention. In the illustration, the same references as those used in FIG. 2 indicate like constituent elements and thus the explanation thereof is omitted.

Referring to FIG. 3, a mixer 40 is provided between the down line 100 and the main modulation unit 14 and sub-modulation unit 16. In the present embodiment, the down line 100 is constituted such that, as shown in FIG. 4, a main channel used for high speed transmission of a modulation signal of user data is allocated to the higher frequency region of the transmission frequency band of 0.3 to 3.4 [kHz] and a sub-channel used for low speed transmission of various control information between MODEMs is allocated to the lower frequency region thereof. For example, the transmission speed in the main channel is 9,600 bits per second [bps], while that in the sub-channel is 75 [bps].

The main modulation unit 14 receives user data, i.e., polling data via a host interface 44 from the host computer 38, divides the polling data into bit data corresponding one modulation corresponding to the modulation speed of 9,600 [bps], and translates the divided data into signal point coordinates on a complex plane by means of a mapping circuit or the like. The unit 14 then amplitude-modulates real components and imaginary components with respect to cos ωt and sin ωt, respectively, and synthesizes the real and imaginary components to output to the mixer 40.

The modulating function of the sub-modulation unit 16 is basically the same as that of the main modulation unit 14. The sub-modulation unit 16 modulates various control information data between MODEMs and then synthesizes real and imaginary components to output to the mixer 40.

The mixer 40 mixes a modulation signal of the main channel output from the main modulation unit 14 with a modulation signal of the sub-channel output from the sub-modulation unit 16, and sends the mixed output to the down line 100.

A separation filter 42 is provided between the up line 200 and the main demodulation unit 26 and sub-demodulation unit 28. The separation filter 42 separates a modulation signal transmitted via the up line 200 from one of the satellite station MODEMs into modulation signals of the main channel and sub-channel, respectively (see FIG. 4)

The main demodulation unit 26 demodulates an analog modulation signal of the main channel separated through the separation filter 42, converts the demodulated analog signal into a digital signal, inputs the demodulated digital signal to a digital signal processor [DSP] (not shown), and effects processing of correcting factors of deterioration in the lines. Concretely, the DSP is provided with a phase jitter removing circuit including AGC, AEQ, CAPC and a prediction filter (PRDF). Namely, the DSP keeps the receiving signal level constant by means of the AGC, removes interference components between signal signs by means of the AEQ, removes frequency offsets and phase errors by means of the CAPC, and removes phase jitter components by means of the PRDF.

After the DSP provided in the main demodulation unit 26 completes the processing of correcting the factors of the line deterioration, a decision circuit (not shown) refers to a table data and decides a right signal point. The decided signal point coordinates are converted by means of a mapping circuit into rows of data bits corresponding to one modulation and, finally, rows of data bits corresponding to every modulation are sequentially linked and then output to the host interface 44. Namely, the user data obtained by the demodulation of the modulation signal transmitted via the up line 200 from one of the satellite station MODEMs is sent via the host interface 44 to the host computer 38.

The demodulating function of the sub-demodulation unit 28 is basically the same as that of the main demodulation unit 26. Namely, the sub-demodulation unit 28 corrects the factors of the line deterioration by means of the DSP from a modulation signal of the sub-channel separated through the separation filter 42 and then decides a right signal point. The decided signal point coordinates are converted by means of a mapping circuit into data of 2 bits corresponding to one modulation and, finally, data of 2 bits of every modulation are sequentially linked and then output to the host interface 44.

Also, the master station MODEM 10 is provided with a control unit 320, which is connected to the sub-modulation unit 16 and sub-demodulation unit 28 and controls the units 16, 28 to transmit the various control information between the master station MODEM and satellite station MODEMs by way of the sub-channels of the down line 100 and the up line 200.

Furthermore, the control unit 320 includes a retraining command unit, which commands the main modulation unit 14 to send a training signal when the sub-demodulation unit 28 receives a signal indicating a request for re-sending of the training signal from the satellite station side. Also, a storing unit 34 is operatively connected to the control unit 320 to store past record information concerning abnormality detection in the satellite station MODEMs and information on execution time of the retraining.

FIG. 5 illustrates a constitution of the satellite station MODEM 12-$i$ as an embodiment of the present invention. In the illustration, the same references as those used in FIG. 2 indicate like constituent elements and thus the explanation thereof is omitted.

Referring to FIG. 5, a separation filter 46 is provided between the down line 100 and the main demodulation unit 18 and sub-demodulation unit 20, and a monitor 302 is operatively connected to the main demodulation unit 18 and a control unit 300 is operatively connected to the monitor 302 and the MODEM unit (18,20,22,24). The monitor 302 and control unit 300 correspond to the abnormality detecting unit 30 shown in FIG. 2. Note, the separation filter 46 has the same function as that of the separation filter 42 in the master station MODEM 10 (see FIG. 3) and thus the explanation thereof is omitted.

The monitor 302 forms a signal indicating quality of the receiving signal based on a decision error indication signal detected by a decision circuit (not shown in FIG. 5) provided in the main demodulation unit 18, and monitors the formed signal. When the level of the monitored signal falls below a predetermined threshold level, the monitor 302 outputs an abnormality detection signal.

Figure 6:
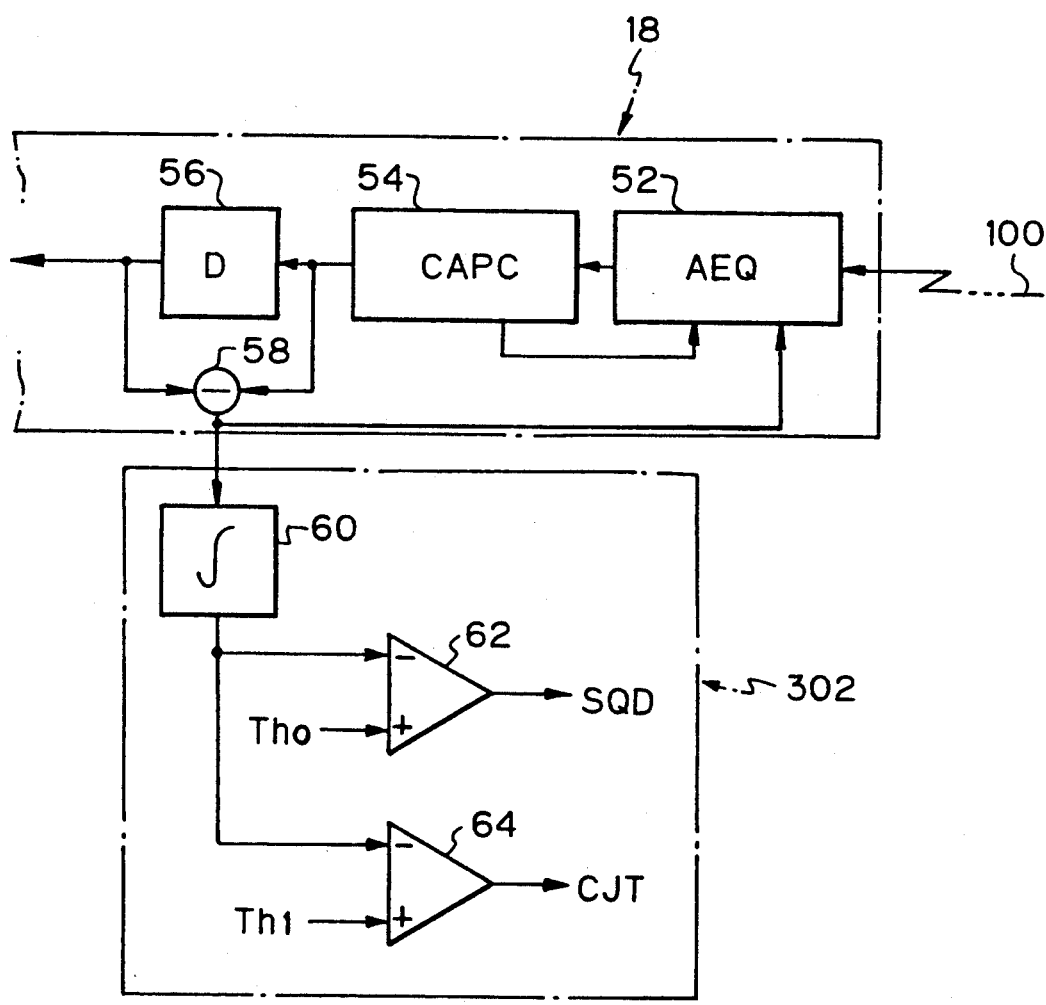
FIG. 6 is a circuit diagram illustrating a constitution of the main parts (302, 18) shown in FIG. 5.

FIG. 6 illustrates a circuit constitution of the main parts, i.e., the monitor 302 and part of the main demodulation unit 18, provided in the satellite station MODEM 12-$i$ of FIG. 5.

Referring to FIG. 6, the main demodulation unit 18 is provided with an automatic equalizer (AEQ) 52 for removing interference components between signs of the signal received through the down line 100, an automatic carrier phase controller (CAPC) 54 for removing frequency offsets and phase errors contained in an output of the AEQ 52, a decision circuit 56 for deciding a right signal point from an output of the CAPC 54, and a subtracter 58 for detecting a difference between input and output signals of the decision circuit 56. The decision circuit 56 is constituted by a hard decision circuit which decides a right signal point based on table data, or a soft decision circuit employing a Viterbi decoding circuit which decides a right signal point based on a trellis coding in the transmitting equipment side, or by a combination of both of the decision circuits.

An output signal of the subtracter 58 is hereinafter referred to as a decision error indication signal, which fed back to the AEQ 52, and input to an integrator 60 in the monitor 302 and integrated therein. The integrated decision error indication signal is input to each of comparators 62 and 64 and compared with predetermined threshold levels Th0 and Th1, respectively. For example, assuming that an output of the integrator 60 is within a range of 0 to 1.0, the threshold level Th0 of the comparator 62 is set to, e.g., 0.5 and the threshold level Th1 of the comparator 64 is set to, e.g., 0.1. Note, the nearer the output of the integrator 60 comes to 1.0, the better the quality of the receiving signal becomes.

The comparator 62 outputs a detection signal SQD of "H" level indicating a detection of lowering in the quality of the receiving signal when the level of the integrated decision error indication signal falls below the threshold level Th0 (=0.5). On the other hand, the comparator 64 outputs an alarm signal CJT of "H" level indicating occurrence of unrestorable trouble or abnormality when the level of the integrated decision error indication signal falls below the threshold level Th1 (=0.1).

Referring again to FIG. 5, when the abnormality detection signal output from the monitor 302 is input to the control unit 300, the control unit 300 judges that a line trouble due to instantaneous breaking or the like occurs in the down line 100, and supplies the sub-modulation unit 24 with a retraining request signal consisting of an address of the corresponding satellite station and abnormality occurrence indication data.

A mixer 48 is provided between the up line 200 and the main modulation unit 22 and sub-modulation unit 24. The mixer 48 has the same function as that of the mixer 40 in the master station MODEM 10 (see FIG. 3) and thus the explanation thereof is omitted. Also, data terminal equipment 50 is provided between the corresponding external terminal equipment 36-$i$ and the main modulation unit 22 and main demodulation unit 18.

The terminal equipment 36-$i$ forms response data based on discrimination of a polling call from the master station and feeds the response data via the data terminal equipment 50 to the main modulation unit 22. The main modulation unit 22 modulates the response data and sends the modulated data via the mixer 48 to the up line 200. On the other hand, the sub-modulation unit 24 modulates the retraining request signal output from the control unit 300 by means of the sub-channel of the up line 200 and sends the modulated signal via the mixer 48 to the up line 200.

Next, the retraining operation in the system of the present invention will be explained with reference to the timing chart shown in FIG. 7.

First, when power is supplied to the master station MODEM 10 and the satellite station MODEMs 12-1 to 12-$n$, the system is brought to its setup status. At times t1 to t2, the main modulation unit 14 in the master station MODEM 10 transmits the training signal, i.e., the modulation signal of training data, via the down line 100 to the main demodulation unit 18 provided in each of the multipoint connected satellite station MODEMs 12-1 to 12-$n$. Upon receipt of the training signal, the corresponding main demodulation unit 18 initializes the AEQ 52, CAPC 54 and decision circuit 56 therein (see FIG. 6) and brings them to a set status of operation parameters for correcting the factors of the line deterioration.

When the sending of the training signal is completed time t2, the host computer 38 supplies the main modulation unit 14 in the master station MODEM 10 with polling data (down-stream message data) for access to the satellite stations according to the predetermined polling procedure. The main modulation unit 14 in turn sends the polling data (down-stream message data) to the down line 100.

In the transmission status of the polling data (down-stream message data) from the master station MODEM 10, the monitor 302 in the satellite station MODEM 12-$i$ (see FIG. 5) monitors presence or absence of occurrence of abnormality based on the decision error indication signal obtained from the main demodulation unit 18.

In the monitoring status of the occurrence of abnormality, for example, assuming that the quality of the receiving signal in the main demodulation unit 18 is lowered due to instantaneous breaking in the down line 100 and, based on the detection signal SQD from the comparator 62 (see FIG. 6), the abnormality is detected at time t3. In this case, after the lapse of a predetermined time from the detection of abnormality, the control unit 300 supplies the sub-modulation unit 24 with the retraining request signal consisting of the address ADD of the corresponding satellite station and the abnormality occurrence indication data DATA. The sub-modulation unit 24 in turn informs the master station MODEM 10 of the retraining request.

A signal indicating the retraining request, which is carried out by means of the sub-channel of the up line 200, is demodulated by the sub-demodulation unit 28 in the master station MODEM 10 at time t4 and then fed to the control unit 320.

When the control unit 320 receives the retraining request signal consisting of the satellite station address ADD and the abnormality occurrence indication data DATA from the satellite station side, it refers to the storing unit 34 based on the satellite station address ADD and reads past record information concerning abnormality detection in the satellite station concerned and the information on the retraining execution time.

Based on the read information, the control unit 320 disregards the retraining request under certain conditions. One condition is when another retraining is requested before the time required for the previous retraining elapses. Another condition is when the master station receives a plurality of requests for the retraining from identical satellite station. In the latter case, the master station MODEM 10 can judge that the plurality of requests are due to trouble in the hardware of the satellite station MODEM concerned, or due to unrestorable trouble in the lines.

Where the conditions for disregarding the retraining request are not found based on results of the reference to the storing unit 34, the control unit 320 controls the main modulation unit 14 to forcibly terminate the modulation of the host data at time t5. Then, at times t5 to t6, the retraining operation of sending the training signal again to the down line 100 is carried out.

When the retraining signal is transmitted from the master station MODEM 10 via the down line 100 to each of the satellite station MODEMs 12-1 to 12-n at times t5 to t6, the main demodulation unit 18 in the satellite station MODEM which detected abnormality initializes the AEQ 52, CAPC 54, and the like (see FIG. 6). As a result, even if the operation parameters are changed to abnormal values due to the instantaneous breaking in the down line 100 and thus the main demodulation unit 18 is brought to an abnormal status, it is possible to quickly restore the demodulation processing to its normal status. When the sending of the retraining signal is completed at time t6, the main demodulation unit 18 in the satellite station MODEM concerned carries out its normal demodulation operation based on the polling data (down-stream message data) from the host computer 38.

On the other hand, as for the other satellite station MODEMs which do not detect abnormality, the transmission of the polling data (down-stream message data) from the host computer 38 is temporarily interrupted during the sending of the retraining signal and thus the initialization by the retraining signal is forcibly carried out. Accordingly, it is possible to reduce the sending time of the retraining signal to a minimum and thus increase the efficiency of utilization of the system network.

Also, the master station MODEM 10 can analyze the statuses of the satellite station MODEMs 12-1 to 12-n based on the retraining request from each MODEM. In this regard, it is possible to inform a network service processor [NSP] (not shown) provided on the side of the master station MODEM 10 of information on satellite stations in which abnormality occurs and the nature of the abnormality, and cause the NSP to analyze the information and then indicate the results.

Figure 8B:
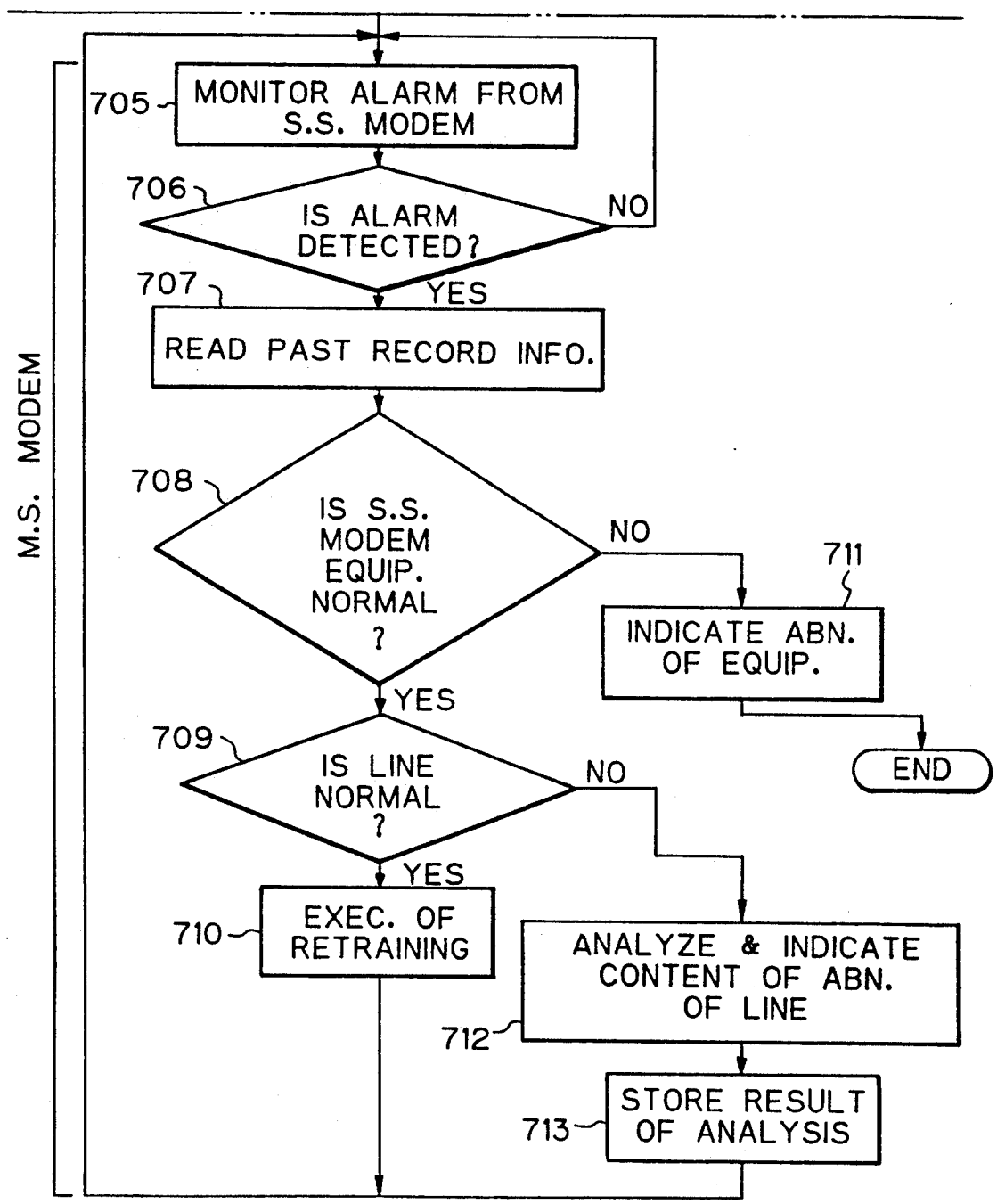

Finally, the retraining method of the present invention will be explained with reference to the flow charts shown in FIGS. 8A and 8B. Note, steps 701 to 704 represent the processings in the satellite station MODEM and steps 705 to 713 represent the processings in the master station MODEM.

At step 701, the monitor 302 monitors the status of the down line 100, i.e., presence or absence of abnormality in the down line 100. At a next step 702, the monitor 302 judges whether the abnormality is present (YES) or not (NO). If the result is YES, the control proceeds to step 703 and, if the result is NO, the control returns to step 701. At step 703, the control unit 300 informs the sub-modulation unit 24 of the contents of the abnormality. At a next step 704, the sub-modulation unit 24 informs the master station MODEM 10 of the contents of the abnormality via the up line 200.

At step 705, the sub-demodulation unit 28 monitors an alarm from the satellite station MODEM or MODEMs. At a next step 706, the judgement of whether the alarm is detected (YES) or not (NO) is carried out. If the result is YES, the control proceeds to step 707 and, if the result is NO, the control returns to step 705. At step 707, the control unit 320 reads the past record information on line troubles and retraining operations from the storing unit 34. At a next step 708, the control unit 320 judges whether the satellite station MODEM equipment concerned is normal (YES) or not (NO). If the result is YES, the control proceeds to step 709 and, if the result is NO, the control proceeds to step 711. At step 711, the control indicates "abnormality" of the satellite station MODEM equipment to the outside. After this step, the control comes to an "END".

On the other hand, at step 709, the control unit 320 judges whether the down line 100 is normal (YES) or not (NO). If the result is YES, the control proceeds to step 710, at which the retraining operation, is carried out with aid of the control unit 320 and main modulation unit 14. After this step, the control returns to step 705. On the other hand, if the result of step 709 is NO, the control proceeds to step 712. At step 712, the control analyzes contents of "abnormality" of the line and indicates the analyzed result to the outside. At a next step 713, the control stores the analyzed result in the storing unit 34. After this step, the control returns to step 705.

As explained above, according to the present embodiment, abnormality of a satellite station MODEM occurring due to trouble in the down line is immediately informed to the master station and in turn the training signal is transmitted again from the master station to the down line. Therefore, it becomes possible to quickly restore the satellite station MODEM concerned to its normal status after recovery of the trouble. This contributes to an increase in the efficiency of utilization of the system network.

Also, since the recovery of the trouble is possible the retraining processing, it is possible to increase the transmission speed of the down-stream message data from 9,600 [bps], for example, to 19,200 [bps] at which a recovery is difficult in case of ordinary data communication.

Also, since each of the satellite stations informs the master station of the retraining request by means of the sub-channel of the transmission line, an advantage is obtained in that ordinary data transmission using the main channel is not subject to influence by the retraining request.

Furthermore, the master station which received the retraining request refers to the past record information concerning abnormality detection in the satellite stations and the information on the retraining execution time. In this case, where the master station has received a plurality of requests for retraining from an identical satellite station, it can judge that the requests are not due to the line trouble, but due to trouble in the hardware of the satellite station MODEM. Therefore, it is possible to cancel the execution of unnecessary retrainings and thus minimize a lowering in the line efficiency due to retraining operations.

Although the present invention has been disclosed and described by way of one embodiment, it is apparent to those skilled in the art that other embodiments and modifications of the present invention are possible without departing from the spirit or essential features thereof.

I claim:

1. A communication system using up and down lines, comprising:

a master station including a first MODEM unit for modulating user data and various control information to transmit the modulated data using different channels of the down line, and demodulating user data and various control information from modulation signals received in different channels of the up line, and a plurality of multipoint connected satellite stations, coupled to said master station by the up and down lines, each satellite station including a second MODEM unit for demodulating user data and various control information from modulation signals received in the different channels of the down line, and modulating user data and various control information to transmit the modulated data by different channels of the up line, said second MODEM unit including abnormality detecting means for controlling the second MODEM unit to request the master station to re-send a training signal including demodulation parameters for the second MODEM unit using a channel different from a channel used for user data in the down line when the abnormality detecting means detects an abnormality from the quality of a signal received at the second MODEM unit, and the first MODEM unit of the master station including retraining command means for commanding the first MODEM unit to send the training signal using a channel different from a channel used for user data in the down line when the first MODEM unit receives a signal indicating the request for re-sending of the training signal from any one of the satellite stations.

2. A communication system as set forth in claim 1, wherein said master station further comprises a storing means for storing past record information concerning abnormality detection in the satellite stations and information regarding an execution time of the retraining, obtained through the first MODEM unit, whereby said retraining command means refers to the storing means upon receipt of a new request for retraining and, based on the past record information on retraining, determines whether it should command the new retraining or not.

3. A communication system as set forth in claim 2, wherein said retraining command means comprises means for disregarding the request for retraining where another retraining is requested before the time required for a previous retraining elapses, or where the master station receives a plurality of requests for the retraining from one satellite station.

4. A communication system as set forth in claim 3, wherein said abnormality detecting means comprises a monitor for monitoring presence or absence of abnormality in the down line and a control means, responsive to an output signal indicating the presence of abnormality, for controlling the second MODEM unit to request the master station to re-send the training signal.

5. A communication system in which a plurality of multiport connected satellite stations are connected via a down line and an up line to a master station, comprising:

a master station including a first MODEM unit for modulating user data and various control information to transmit the modulated data using different channels of the down line, and demodulating user data and various control information from modulation signals received in different channels of the up line, and each of the satellite stations including a second MODEM unit for demodulating user data and various control information from modulation signals received in the different channels of the down line, and modulating user data and various control information to transmit the modulated data by different channels of the up line, the second MODEM unit of each satellite station including an abnormality detecting means for controlling the second MODEM unit to request the master station to re-send a training signal when the abnormality detecting means detects an abnormality from the quality of a signal received at the second MODEM unit, and the first MODEM unit of the master station including a retraining command means for commanding the first MODEM unit to send the training signal when the first MODEM unit receives a signal indicating the request for re-sending of the training signal from any one of the satellite stations, said first MODEM unit including a first main modulation unit for transmitting user data at a relatively high speed using a main channel of the down line, a first sub-modulation unit for transmitting various control information at a relatively low speed using a sub-channel of the down line, a first main demodulation unit for demodulating user data from a modulation signal received in a main channel of the up line, and a first sub-demodulation unit for demodulating various control information from a modulation signal received in a sub-channel of the up line, and said second MODEM unit including a second main demodulation unit for demodulating user data from a modulation signal received in the main channel of the down line, a second sub-demodulation unit for demodulating various control information from a modulation signal received in the sub-channel of the down line, a second main modulation unit for transmitting user data at a relatively high speed using the main channel of the up line, and a second sub-modulation unit for transmitting various control information at a relatively low speed using the sub-channel of the up line.

6. A communication system in which a plurality of multipoint connected satellite stations are connected via a down line and an up line to a master station, the master station comprising a first main modulation unit for modulating user data to transmit the modulated data at a relatively high speed by means of a main channel of the down line, a first sub-modulation unit for modulating various control information to transmit the modulated data at a relatively low speed by means of a sub-channel of the down line, a first main demodulation unit for demodulating user data from a modulation signal received in a main channel of the up line, and a first sub-demodulation unit for demodulating various control information from a modulation signal received in a sub-channel of the up line, and each of the satellite stations comprising a second main demodulation unit for demodulating user data from a modulation signal received in the main channel of the down line, a second sub-demodulation unit for demodulating various control information from a modulation signal received in the sub-channel of the down line, a second main modulation unit for modulating user data to transmit the modulated data at a relatively high speed by means of the main channel of the up line, and a second sub-modulation unit for modulating various control information to transmit the modulated data at a relatively low speed by means of the sub-channel of the up line, wherein each satellite station comprises an abnormality detecting means, operatively-connected to the second main demodulation unit, for controlling the second sub-modulation unit to request the master station to re-send a training signal when the abnormality detecting means detects an abnormality from the quality of a signal received at the second main demodulation unit, and the master station comprises a storing means for storing past record information concerning abnormality detection in the satellite stations and information on execution time of the retraining, obtained through the first sub-demodulation unit, and a retraining command means, operatively connected to the first sub-demodulation unit, for referring to the storing means and commanding the first main modulation unit to send the training signal when the first sub-demodulation unit receives a signal indicating the request for re-sending of the training signal from any one of the satellite stations.

7. A method of retraining a MODEM provided in each of a plurality of multipoint connected satellite stations which are connected via a down line and an up line to a master station including a storing unit, the method comprising the steps of:

in each of the satellite stations, monitoring presence or absence of occurrence of abnormality in the down line;

judging whether the abnormality is present or not; and, proceeding with a normal transmission using the down line when the abnormality is not present;

where the abnormality is present, informing the master station of a content of the abnormality via the up line; and, in the master station, monitoring presence or absence of an alarm indicating abnormality from each of the satellite stations;

judging whether the alarm is detected or not;

where the alarm is detected, reading past record information concerning abnormality detection of the satellite station with the abnormality and information on retraining execution time from the storing unit;

judging whether the down line is normal or not; and where the down line is normal, sending a training signal including demodulation parameters using a channel different from a channel used for user data again to the down line to retrain a MODEM corresponding to the satellite station concerned.

8. A method as set forth in claim 7, further comprising the step of, where the down line is abnormal, analyzing the contents of abnormality to indicate the analyzed results.

9. A method as set forth in claim 7, further comprising the step of judging whether the satellite station concerned is normal or not and, where the satellite station concerned is abnormal, indicating abnormality thereof.

10. A method of training a MODEM provided in each of a plurality of multipoint connected satellite stations which are connected via a down line and an up line to a master station, comprising the steps of:

a) monitoring a presence or absence of an abnormality in the down line using at least one of the multipoint connected satellite stations;

b) proceeding with a normal transmission from the master station using the down line when the abnormality is not present;

c) sending an alarm signal from one of the multipoint connected satellite stations to the master station using the up line when the abnormality is detected; and d) sending a training signal including demodulation parameters using a channel different from a channel used for user data in the down line, from the master station to one of the multipoint connected satellite stations, in response to the alarm signal.

11. A method as set forth in claim 10, wherein the training signal is sent from the master station to all of the plurality of multipoint connected satellite stations.

12. A MODEM unit provided in a first station coupled to a second station via up and down lines, comprising:

a main demodulation unit coupled to the down line to receive data from the second station;

a main demodulation unit coupled to the up line to transmit data to the second station;

an abnormality detecting means coupled to the main demodulation unit, for detecting a presence or absence of an abnormality from data received at the main demodulation unit; and a sub-modulation unit coupled to the abnormality detecting means, for sending out control data using a sub-channel of the up line, for requesting the second station to send a training signal.

13. A MODEM unit as set forth in claim 12, wherein the training signal includes demodulation parameters.

14. A MODEM unit provided in a station coupled to other stations via up and down lines, comprising:

a main demodulation unit coupled to the up line to receive data from the other stations;

a sub-demodulation unit coupled to the up line, for receiving control data in a sub-channel of the up line sent from one of the other stations to the station;

retraining command means coupled to the sub-demodulation unit, for commanding a sending of a training signal when the sub-demodulation unit receives the control data indicating a request for the sending of the training signal; and a main modulation unit, coupled to the retraining command means and responsive to the commanding from the retraining command means, for sending the training signal to one of the other stations indicated by the request.

15. A MODEM unit as set forth in claim 12, further comprising means coupled to the retraining command means, for storing information concerning the request for sending the training signal sent from the other stations.

16. A MODEM unit as set forth in claim 14, wherein the training signal is sent from the main modulation unit to all of the other stations.

UNITED STATES PATENT AND TRADEMARK OFFICE
CERTIFICATE OF CORRECTION

PATENT NO. : 5,321,722
DATED : June 14, 1994
INVENTOR(S) : Tohru OGAWA

It is certified that error appears in the above-indentified patent and that said Letters Patent is hereby corrected as shown below:

Cover PAGE: [56] References Cited, insert the following:

FOREIGN PATENT DOCUMENTS

DE 28245781A1   6/5/78   Germany
DE 2532414   7/19/75   Germany

OTHER PUBLICATIONS

IEEE NATIONAL TELECOMMUNICATIONS CONFERENCE NTC '76, Dallas, Texas, November 29, 1976 - December 1, 1976, pp 50.1-1 - 50.1-4, New York, NS; G.D. Forney, Jr. et al., "Multipoint networks: Advances in modem design and control".

Cover PAGE: [57] ABSTRACT, line 2, after "via" insert --a--.

Col. 3, line 56, after "and," insert --in--.

Col. 4, line 16, change ";" to --,--;
line 58, after "unit" insert --16--.

Col. 5, line 11, after "200" insert --.--.

Col. 6, line 16, after "FIG. 4)" insert --.--.

Col. 10, line 58, after "and" insert --,--; and after "turn" insert --,--.

UNITED STATES PATENT AND TRADEMARK OFFICE
CERTIFICATE OF CORRECTION

PATENT NO. : 5,321,722
DATED : June 14, 1994
INVENTOR(S) : Tohru Ogawa

It is certified that error appears in the above-indentified patent and that said Letters Patent is hereby corrected as shown below:

Column 13, line 38, change "operatively-connected" to --operatively connected--.

Signed and Sealed this

Eleventh Day of October, 1994

Attest:

BRUCE LEHMAN

Attesting Officer     Commissioner of Patents and Trademarks